United States Patent [19]

Townsend

[11] Patent Number: 4,730,368

[45] Date of Patent: Mar. 15, 1988

[54] METHOD AND MEANS OF SKINNING MEAT

[75] Inventor: Ray T. Townsend, Des Moines, Iowa

[73] Assignee: Townsend Engineering Company, Des Moines, Iowa

[21] Appl. No.: 10,161

[22] Filed: Feb. 2, 1987

Related U.S. Application Data

[63] Continuation of Ser. No. 821,433, Jan. 21, 1986.

[51] Int. Cl.[4] .............................................. A22C 7/12
[52] U.S. Cl. .......................................... 17/50; 17/21; 99/589
[58] Field of Search ................ 17/21, 50, 62; 99/589, 99/588

[56] References Cited

U.S. PATENT DOCUMENTS

| | | | |
|---|---|---|---|
| 2,715,427 | 8/1955 | Townsend | 17/21 X |
| 3,324,915 | 6/1967 | Townsend | 17/21 X |
| 3,360,026 | 12/1967 | Schill | 17/21 X |
| 3,769,903 | 11/1973 | Greider | 99/589 |
| 3,931,665 | 1/1976 | Townsend | 17/21 |
| 4,561,150 | 12/1985 | Townsend | 17/21 X |

Primary Examiner—Willie G. Abercrombie
Attorney, Agent, or Firm—Zarley, McKee, Thomte, Voorhees & Sease

[57] ABSTRACT

A meat skinning machine and method for skinning wherein a shelf means is adjustably positioned between a meat support surface and the cutting edge of a skinning knife just beyond the periphery of the teeth of a gripping roll wherein the meat is supported immediately adjacent the cutting edge at a position beyond the periphery of the gripping roll just prior to the time the meat moves into contact with the cutting edge to permit the meat to move in an angular direction towards the roll and into contact with the edge.

4 Claims, 8 Drawing Figures

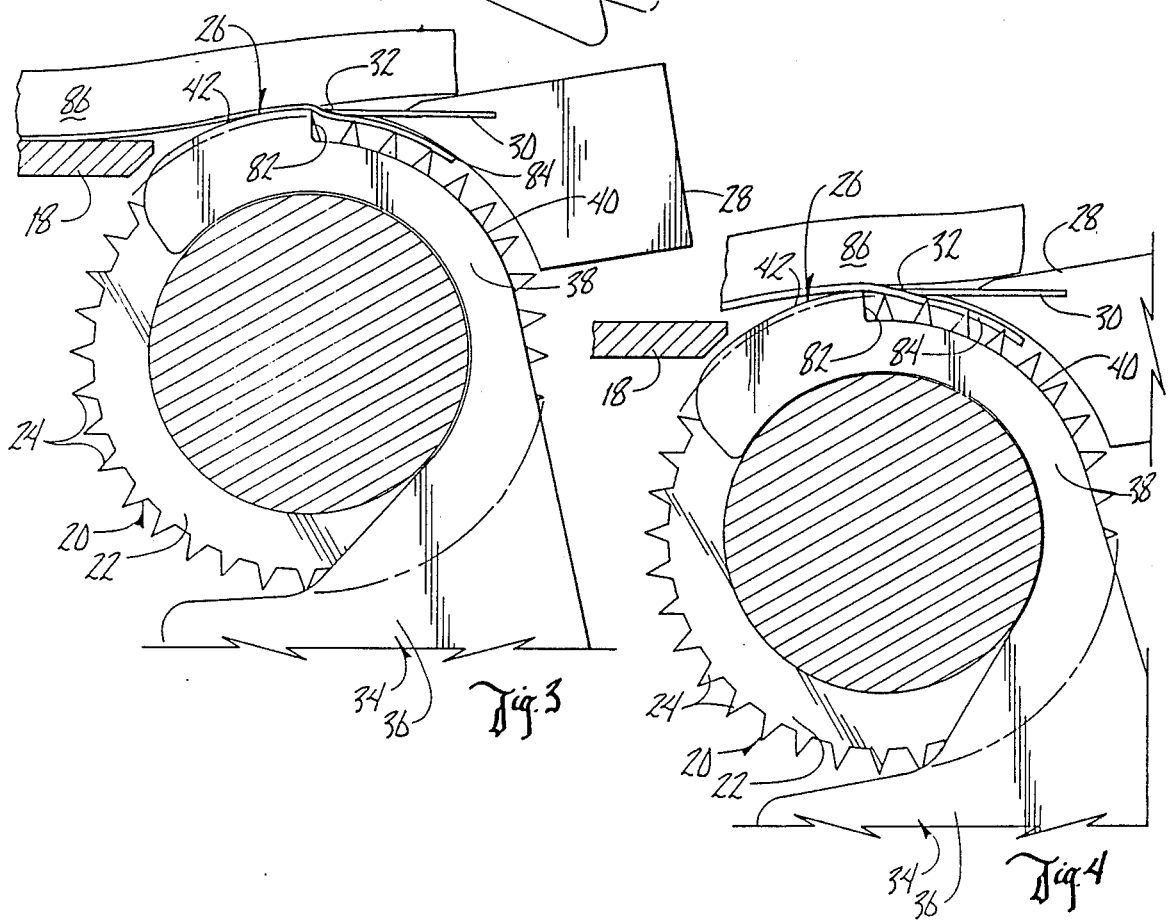

METHOD AND MEANS OF SKINNING MEAT

BACKGROUND OF THE INVENTION

Meat skinning machines characteristically include a frame which includes a meat supporting surface, a cylindrical gripping roll with a plurality of teeth on the outer surface thereof, and a blade holding device which maintains a cutting blade closely adjacent the teeth of the gripping roll. The meat, fish or poultry to be skinned is moved into contact with the teeth of the gripping roll which pulls the meat into engagement with the cutting edge of the blade. The blade severs the skin of the meat product whereby the separated skin is pulled underneath the blade by the gripping roll, and the skinned meat product passes over the top of the blade to a suitable receptacle.

The thickness of the skin or layer of material to be removed from the meat product in conventional skinning machines has heretofore been varied by adjusting the position of the cutting edge of the blade with respect to the teeth of the gripping roll. Thus, when the cutting edge is positioned closely adjacent the cutting teeth a thinner layer is removed from the meat product. Conversely, when the cutting edge is spaced further from the periphery of the gripping teeth of the gripper roll a thicker layer of skin and/or fat is removed from the meat product.

While great advances have been made in skinning machines over the years, the precision at which skin or membranes are removed from meat products has been less than perfect. Obviously, valuable meat products are wasted if too much material is removed, and the quality of the meat product is depreciated if less than the desired skin or membrane is removed.

BRIEF DESCRIPTION OF THE INVENTION

The present invention provides an elongated shelf means immediately adjacent the cutting edge of the blade with the shelf means extending radially beyond the periphery of the gripping roll to support the meat product until just prior to the time when the meat product moves into contact with the cutting edge of the blade. The shelf means permits the meat product to then move in an angular direction towards the gripping roll and into contact with the cutting edge of the blade to permit the cutting edge to separate the membrane or skin from the meat product. The separated skin or membrane will engage the teeth of the gripping roll to be pulled away from the cutting edge by these teeth in a path between the cutting blade and the teeth. Variations in the depth of cut of the cutting blade are achieved by varying the distance between the shelf means and the cutting edge of the blade. A greater distance creates a deeper cut, and a close spacing results in a thinner cut.

The shelf means of this invention is presented in several embodiments. The first embodiment includes conventional skin stripping elements having a base portion and an arcuate open hook portion having a peripherial edge, with the hook portion being received into an annular groove cut in the gripping roll. A meat supporting edge extends radially beyond the outer peripheral surface of the hook portion. When a plurality of the stripper elements are placed in a plurality of annular groove in the gripper roll, the protruding meat supporting edges on the stripper elements provide the supporting shelf means of this invention.

Alternate forms of the invention provide the supporting shelf mounted on the frame of the skinning machine independent of any stripper elements. The second embodiment has a plurality of meat supporting fingers which extend into the annular grooves of the gripping roll in a position closely adjacent the cutting edge of the cutting blade to provide the necessary shelf means. A third embodiment with either fingers or of solid construction is positioned similarly except that it is positioned beyond the periphery of the teeth of the gripping roll and allows a gripping roll without annular grooves to be utilized.

The above-described stripping elements and shelf means are adjustably mounted so that the distance between the shelf means and the cutting edge of the blade can be selectively varied.

The method of this invention contemplates the support of the meat product immediately adjacent the cutting edge of the blade at a position radially beyond the periphery of the gripping roll to support the meat product until just prior to the time that the meat product moves into contact with the cutting edge to permit the meat product to move in an angular direction towards the gripping roll and into contact with the cutting edge to permit the blade to separate the membrane from the meat product. The separated membrane will then engage the teeth and be pulled away from the cutting edge by the teeth in a path between the cutting blade and the teeth.

A principal object of the invention is to provide a skinning machine which will more accurately and efficiently allow a predetermined amount of skin or membrane to be removed from a meat product.

A further object of the invention is to provide a skinning machine that provides a support means for the meat product at a location immediately adjacent the cutting edge of the cutting blade at a location beyond the periphery of the teeth of the gripping roll to allow the meat product to move in an angular direction into contact with the cutting edge whereby the blade will remove the desired skinner membrane from the meat product and the separated skin will be pulled by the teeth of the gripping roll into a path between the blade and the roll.

A still further object of this invention is to provide a skinning machine that can be easily adjusted to vary the space between the meat supporting shelf and the cutting edge of the blade to achieve variations in the thickness of the skin or membrane being removed from the meat product.

A further object of this invention is to provide a method of skinning meat products whereby the meat is supported closely adjacent the cutting edge of the cutting blade in a position beyond the periphery of the teeth of the gripping roll, and whereby the meat product is then permitted to move in an angular path towards the cutting edge of the blade whereby the blade can separate the skin or membrane from the meat product and the teeth of the gripping roll can pull the separated skin or membrane away from the cutting edge.

A still further object of this invention is to provide a stripper element for a meat skinning machine which will have a meat supporting edge at one end of an arcuate open-ended hook portion which, when assembled with other stripper elements in the spaced annular grooves of a gripping roll, will provide a meat supporting surface immediately adjacent the cutting edge of the blade.

These and other objects will be apparent to those skilled in the art.

BRIEF DESCRIPTION OF THE DRAWINGS

FIG. 1 is a perspective view of the meat skinning machine of this invention;

FIG. 2 is an enlarged scale sectional view through the gripper roll of the skinning machine of this invention, and shows the stripper elements and meat supporting edges associated therewith;

FIG. 3 is an enlarged scale view of the upper portion of FIG. 2;

FIG. 4 is an enlarged scale view of the upper portion of FIG. 2, but with the stripper elements in an adjusted position to create a greater space between the meat supporting edges of the stripper elements and the cutting edge of the blade;

DESCRIPTION OF THE PREFERRED EMBODIMENT

The term "meat product" as used herein will be understood to include meat, poultry and fish products. The terms "skin" and "membrane" will be used synonymously herein unless specifically designated otherwise.

Figure 5:
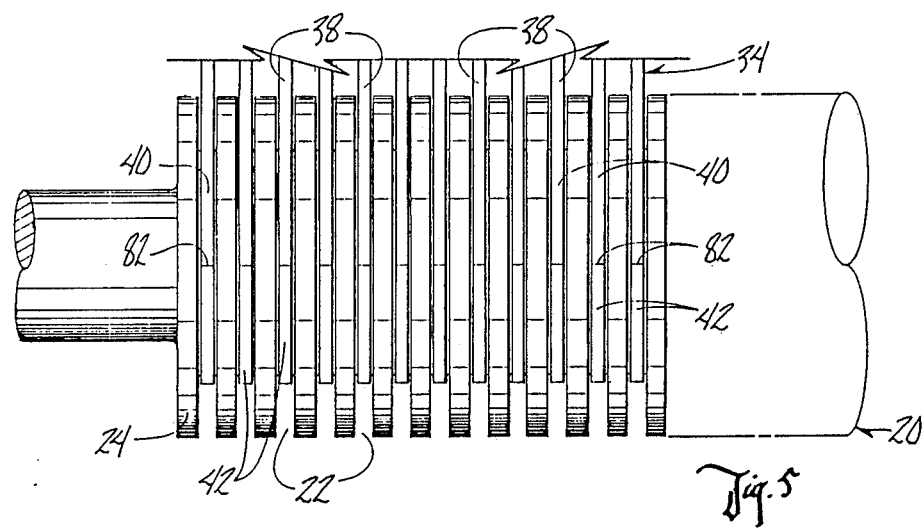
FIG. 5 is a plan view of a gripper roll of this invention with the stripper elements of FIGS. 2–4 inserted in the annular grooves therein.

With reference to FIGS. 1 and 2, the machine 10 is generally comprised of a frame 12 having supporting legs 14. An upper meat support surface 16 is located on the upper portion of frame 12, and a second meat support surface 18 is provided on the top of frame 12 opposite to meat support surface 16. A conventional toothed gripping roll 20 is rotatably mounted by conventional means on frame 12. Gripping roll 20 can have conventional annular grooves 22 cut therein as best seen in FIG. 5. A plurality of teeth 24 are cut on the outer surface of roll 20. A shelf means 26 (FIG. 1) is positioned on the machine in a position parallel to grippng roll 20 and positioned slightly over the gripping roll. A conventional blade holder 28 is mounted on the machine and holds conventional cutting blade 30 having a cutting edge 32 at a position closely adjacent the teeth 24 on roll 20.

The first embodiment of the invention is best shown in FIGS. 1–5 and includes a plurality of stripper elements 34 which have a base portion 36 and an arcuate open hook portion 38 extending from the base portion. The hook portion 38 has an upper peripheral surface 40 which terminates in a meat support edge 42. The hook portion 38 is complementary in shape to the annular groove 22 and has a vertical thickness such that the upper peripheral surface 40 dwells at a position radially inwardly from the outer tips of teeth 24. However, as clearly shown in FIGS. 2, 3 and 4, the meat support edge 42 dwells in a plane radially beyond the tips of the teeth 24. When the support edges 42 of a plurality of stripper elements 34 are mounted in a plurality of annular grooves 22 of a gripping roll 20, a collective shelf 26 is formed to support a meat product at a position beyond the outer periphery of the teeth 24 of roll 20.

As shown in FIG. 2, a shaft 44 extends through a suitable aperture in each of the stripper elements 34 in a direction parallel to the axis of gripper roll 20. Lugs 46 are mounted on the ends of shaft 44 and the inner ends of threaded bolt 48 are rotatably journaled in any convenient fashion with lugs 46. Aperture 50 in frame member 12A slidably receives the threaded bolt 48. Lock nut 52 is threadably mounted on bolt 48 and control knob 54 is mounted on the outer end of bolt 48.

The pivotal position of stripper element 34 is changed from the position shown in the solid lines of FIG. 2 to the position shown by the dotted lines merely by grasping knob 54, pulling bolt member 48 outwardly so that shaft 44 moves from position A to position B, and lock nut 48 is then rotated to a position adjacent frame member 12A to hold the shaft 44 in this adjusted position. This rotation of stripper element 34 causes the support edge 42 to move from a closely spaced position with respect to the cuttng edge 32 of blade 30 (FIG. 3) to a greater spaced position as shown in FIG. 4. The position illustrated in FIG. 3 of these components is better adapted to strip the thin membrane of steak or the like from the steak, and the greater space illustrated in FIG. 4 is better suited to strip heavier skin from chicken or other poultry products.

Figure 6:
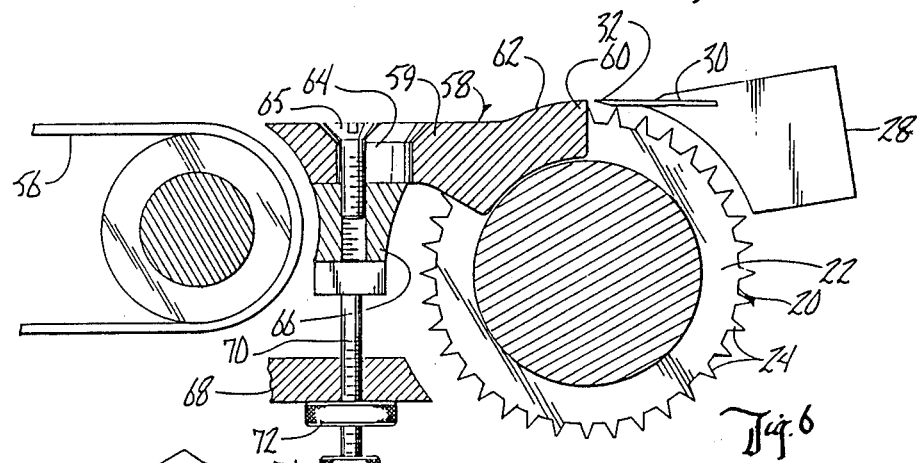
FIG. 6 is a sectional view through an alternate form of the invention wherein a shelf means having a plurality of fingers inserted into annular grooves of the gripping roll are positioned to provide a meat supporting surface immediately adjacent the cutting edge of the blade.

A second embodiment of the invention is shown in FIG. 6 wherein a conventional meat conveying device 56 is utilized in place of the meat support 16. A shelf 58 is positioned on the machine adjacent the cutting edge 30 of blade 32. Shelf 58 includes a solid base portion 59 which terminates in a plurality of spaced apart fingers 60. Fingers 60 have an upper meat support edge 62 similar to the meat support edge 42 on stripper element 34. The fingers 60 are received in the grooves 22 of roll 20 but the meat support edges 62 of fingers 60 extend radially outwardly beyond the periphery of the teeth 24 of roll 20.

An elongated slot 64 appears in the base 59 of shelf 58 and receives adjustment screw 65 which is threadably mounted in frame member 66. Frame member 68 has a suitable vertical aperture to slidably receive threaded bolt 70 which has its upper end rotatably journaled by any convenient means in frame member 66. A lock nut 72 is threadably mounted on bolt 70, and knob 74 is located on the lower end of bolt 70.

Shelf 58 can be moved laterally towards or away from blade 30 by loosening screw 65 and moving the shelf to the desired position whereupon screw 65 is tightened to maintain the new position. Similarly, shelf 58 can be raised or lowered by adjusting the lock nut 72 on bolt 70 and moving bolt 70 upwardly or downwardly to move frame member 66 and shelf 58 upwardly or downwardly. Frame member 66 is movably mounted by any convenient means on frame 12. Thus, the adjustment of frame 58 in a horizontal or vertical direction can be easily implemented.

Figure 8:
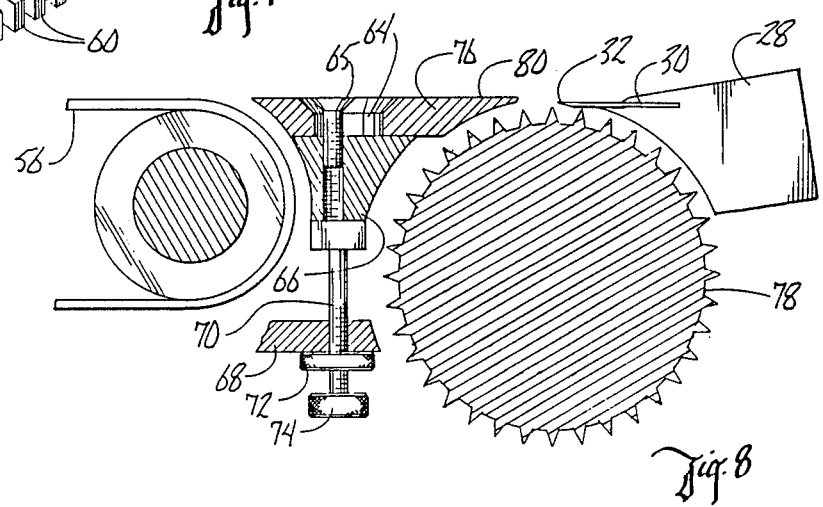
FIG. 8 is a sectional view similar to that of FIG. 6 but showing a third embodiment of the invention where the shelf means is supported at a position beyond the periphery of the teeth of the gripping roll.

A third alternate form of the invention is shown in FIG. 8. The structure of FIG. 8 is similar to that of FIG. 6, except that a shelf 76 is attached to frame member 66 at a position beyond the periphery of the teeth of gripping roll 78. Shelf 76 has an upper meat support edge or surface 80 which can be either of solid and continuous construction, or can be divided into a plurality of fingers similar to the fingers 60 on shelf 58. Shelf 76 can be utilized in the position shown in FIG. 8 either with a solid roll 78 having continuous teeth 24A, or a roll similar to gripping roll 20 utilizing conventional stripper elements without the support edge 42 which comprise a part of stripper element 34.

The normal operation of the device of FIGS. 1-5 involves the adjustment of the desired spacing between the support edge 42, and the cutting edge 32 of blade 30. See the variations in this spacing between FIGS. 3 and 4.

The meat product is moved from left to right on meat support surface 16 as seen in FIGS. 2-4 and as the meat product leaves the surface 16 it is supported on the edges 42 in a position radially beyond the teeth of gripping roll 20. As the meat product moves past the forward edge 82 of support edge 42, it moves instantaneously in an angular direction downwardly towards the teeth of gripping roll 20. The meat is instantaneously engaged by the cutting edge 32 of blade 30, and the membrane or skin 84 is gripped by the teeth 20 and pulled downwardly between the teeth and the blade 30 as it is separated from the meat product 86. This phenomenon is best shown in FIGS. 3 and 4.

This angular "bite" that the structure of this invention creates is afforded by the meat support edges 42 which dwell beyond the outer periphery of the teeth 24 on gripping roll 20. Unlike prior art skinning machines, the meat product is not gripped and supported on the teeth of the gripping roll as the meat product moves into position with respect to the cutting blade of the machine.

Figure 7:
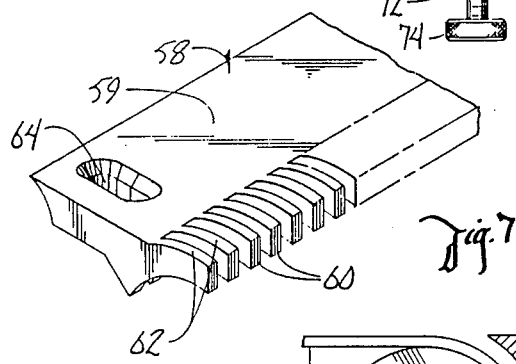
FIG. 7 is a partial perspective view of the shelf means of FIG. 6.

The shelves 58 and 76 in the embodiments shown in FIGS. 6, 7 and 8 function similar to the device of FIGS. 2-5 in that the shelves 58 and 76 both provide a meat support surface beyond the periphery of the teeth of the respective gripping rolls to support the meat product until it is closely positioned with respect to the cutting edge 32 of the blade 30. The positions of the shelves 58 and 56 can be moved towards or away from the cutting edge 32 and can be raised or lowered vertically as required. Again, a close spacing of the shelves with respect to the cutting edge of the blade results in the removal of a thinner layer of material from a meat product, and a wider space results in a thicker layer of material being removed from the meat product.

From the foregoing, it can be seen that this invention achieves at least its stated objectives.

I claim:

1. A skinning machine comprising a frame, a powered gripping roll having a plurality of gripping teeth rotatably mounted on said frame, a cutting blade having a cutting edge mounted on said frame with said cutting edge being closely spaced from and parallel to said roll, a support means on said frame adjacent said gripping roll for supporting meat products having a membrance on the lower surface thereof to be moved towards said cutting blade, the improvement comprising,
   an elongated shelf means for controlling the thickness of the portion of said meat product to be removed in conjunction with the removal of the membrane to be removed from said meat product,
   said shelf means mounted on said machine between said support means and said cutting edge; said shelf means being immediately adjacent said cutting edge and including a meat supporting edge which extends beyond the periphery of said gripping roll to support said meat product until just prior to the time that said meat product moves into contact with said cutting edge to permit said meat product to move in an angular direction towards said gripping roll and into contact with said cutting edge to permit said cutting edge to separate said membrane from said meat product whereby said separated memberane will engage said teeth and be pulled away from said cutting edge by said teeth in a path between said cutting blade and said teeth;
   said shelf means being adjustably mounted on said machine so that the distance between said shelf means and the cutting edge of said blade can be varied.

2. The method of skinning meat on a skinning machine comprising a frame, a powered gripping roll having a plurality of gripping teeth rotatably mounted on said frame, a cutting blade having a cutting edge mounted on said frame with said cutting edge being closely spaced from and parallel to said roll, a support means on said frame adjacent said gripping roll for supporting meat products having a membrane on the lower surface thereof to be moved towards said cutting blade, a shelf means on said frame immediately adjacent said cutting edge and including a meat supporting edge which extends beyond the periphery of said gripping roll for supporting said meat products comprising,
   moving a meat product to be skinned on said support means, and thence on said meat supporting edge in a path beyond the periphery of said gripping roll toward said cutting edge,
   movably supporting said meat product immediately adjacent said cutting edge at a position beyond the periphery of said gripping roll until just prior to the time that said meat product moves into contact with said cutting edge to permit said meat product to move in an angular direction towards said gripping roll and into contact with said cutting edge to permit said cutting edge to separate said membrane from said meat product whereby said separated membrane will engage said teeth and be pulled away from said cutting edge by said teeth in a path between said cutting blade and said teeth,
   adjusting the position of said shelf means with respect to said cutting edge of said blade to adjust the thickness of said meat product to be removed in conjunction with the removal of the membrane to be removed from said meat product.

3. A skinning machine comprising a frame, a powered gripping roll having a plurality of gripping teeth rotatably mounted on said frame, a cutting blade having a cutting edge mounted on said frame with said cutting edge being closely spaced and parallel to said roll, the improvement comprising,
   an elongated shelf means for controlling the thickness of the portion of said meat product to be removed in conjunction with the removal of the membrane to be removed from said meat product,
   said shelf means mounted on said machine immediately adjacent said cutting edge and having a plurality of spaced apart fingers extending beyond the periphery of said gripping roll to support said meat product until just prior to the time that said meat product moves into contact with said cutting edge to permit said meat product to move in an angular direction towards said gripping roll and into contact with said cutting edge to permit said cutting edge to separate said membrane from said meat product whereby said separated membrane will engage said teeth and be pulled away from said cutting edge by said teeth in a path between said cutting blade and said teeth;

said elongated shelf means having a plurality of fingers having inner portions which terminate closely adjacent said cutting edge and having outer portions which support said meat product.

4. The machine of claim 3 wherein said shelf means is adjustably mounted on said machine so that the distance between said shelf means and said cutting edge can be varied.

* * * * *